US012132820B1

(12) United States Patent
    Sheth

(10) Patent No.: US 12,132,820 B1
(45) Date of Patent: Oct. 29, 2024

(54) BLOCKCHAIN NETWORK IDENTIFIER CLAIMING USING REGISTRATION STATUS REQUESTS

(71) Applicant: VERISIGN, INC., Reston, VA (US)

(72) Inventor: Swapneel Sheth, Fairfax, VA (US)

(73) Assignee: Verisign, Inc., Reston, VA (US)

( * ) Notice: Subject to any disclaimer, the term of this patent is extended or adjusted under 35 U.S.C. 154(b) by 261 days.

(21) Appl. No.: 17/325,646

(22) Filed: May 20, 2021

(51) Int. Cl.
  *H04L 29/06* (2006.01)
  *H04L 9/00* (2022.01)
  *H04L 9/06* (2006.01)
  *H04L 9/08* (2006.01)
  *H04L 9/32* (2006.01)
  *H04L 61/4511* (2022.01)

(52) U.S. Cl.
  CPC ........... *H04L 9/0643* (2013.01); *H04L 9/006* (2013.01); *H04L 9/0819* (2013.01); *H04L 9/3247* (2013.01); *H04L 61/4511* (2022.05); *H04L 9/50* (2022.05)

(58) Field of Classification Search
  CPC ..... H04L 9/0643; H04L 9/006; H04L 9/0819; H04L 9/3247; H04L 61/4511; H04L 9/50
  See application file for complete search history.

(56) References Cited

U.S. PATENT DOCUMENTS

| 10,136,315 | B2 * | 11/2018 | Gong | H04W 12/069 |
| 10,721,060 | B1 | 7/2020 | Kaizer et al. | |
| 10,891,390 | B1 * | 1/2021 | Volvovski | G06F 11/00 |
| 10,972,426 | B1 * | 4/2021 | Sinha | H04L 61/4511 |
| 10,986,184 | B1 * | 4/2021 | Seymour | G06F 9/5044 |
| 11,159,326 | B1 | 10/2021 | Nelson et al. | |
| 11,245,514 | B1 * | 2/2022 | Mao | H04L 9/3247 |
| 11,245,576 | B2 * | 2/2022 | Marks | H04L 41/5045 |

(Continued)

FOREIGN PATENT DOCUMENTS

| CN | 102045413 A | * | 5/2011 | |
| CN | 107533501 A | * | 1/2018 | G06F 21/64 |

(Continued)

OTHER PUBLICATIONS

Copenheaver, Blaine R. (Examiner), International Search Report and Written Opinion issued in International Application No. PCT/US2019/038447 on Sep. 30, 2019, pp. 1-15.

(Continued)

*Primary Examiner* — Sher A Khan
(74) *Attorney, Agent, or Firm* — Lee & Hayes, P.C.

(57) ABSTRACT

Systems, methods, computer products for associating a blockchain address with a network identifier enable operations that may include: receiving, over a computer network and by a network identifier infrastructure operator, a request for a registration status of the network identifier; retrieving, by the network identifier infrastructure operator, an association of the network identifier with the blockchain address; signing, by a private key of a key pair of the network identifier infrastructure operator, the association of the network identifier with the blockchain address, which produces a signed association of the network identifier with the blockchain address; and providing, over the computer network and by the network identifier infrastructure operator, the signed association of the network identifier with the blockchain address.

22 Claims, 5 Drawing Sheets

(56) References Cited

U.S. PATENT DOCUMENTS

| | | | |
|---|---|---|---|
| 11,354,658 B2 * | 6/2022 | Lyons | H04L 9/3236 |
| 11,392,579 B2 | 7/2022 | Kasimov et al. | |
| 11,587,071 B2 * | 2/2023 | Ravinathan | G06Q 20/02 |
| 11,621,829 B2 | 4/2023 | Kaizer et al. | |
| 11,632,236 B1 | 4/2023 | Kaizer et al. | |
| 11,954,672 B1 * | 4/2024 | Hamera | H04L 9/3247 |
| 2004/0008666 A1 * | 1/2004 | Hardjono | H04L 63/0823 370/352 |
| 2007/0130316 A1 | 6/2007 | Turakhia | |
| 2007/0143469 A1 | 6/2007 | Adams et al. | |
| 2008/0235383 A1 | 9/2008 | Schneider | |
| 2011/0296440 A1 | 12/2011 | Aurich et al. | |
| 2012/0011360 A1 | 1/2012 | Engels et al. | |
| 2012/0174198 A1 * | 7/2012 | Gould | H04L 63/0807 726/6 |
| 2014/0052984 A1 * | 2/2014 | Gupta | H04L 61/4511 713/162 |
| 2015/0278820 A1 | 10/2015 | Meadows | |
| 2016/0173439 A1 | 6/2016 | Kaliski, Jr. et al. | |
| 2016/0196300 A1 | 7/2016 | Kamdar et al. | |
| 2016/0283941 A1 * | 9/2016 | Andrade | G06Q 20/3829 |
| 2016/0292672 A1 | 10/2016 | Fay et al. | |
| 2017/0180134 A1 | 6/2017 | King | |
| 2017/0310484 A1 | 10/2017 | Kaliski, Jr. et al. | |
| 2017/0324738 A1 * | 11/2017 | Hari | H04W 12/108 |
| 2017/0330174 A1 | 11/2017 | Demarinis et al. | |
| 2017/0344988 A1 | 11/2017 | Cusden et al. | |
| 2017/0346833 A1 | 11/2017 | Zhang | |
| 2018/0227275 A1 | 8/2018 | Russinovich et al. | |
| 2018/0262493 A1 | 9/2018 | Andrade | |
| 2018/0276663 A1 * | 9/2018 | Arora | H04L 9/0861 |
| 2018/0287997 A1 | 10/2018 | Li et al. | |
| 2019/0121988 A1 | 4/2019 | van de Ruit et al. | |
| 2019/0156040 A1 | 5/2019 | Sasin et al. | |
| 2019/0166085 A1 | 5/2019 | Li et al. | |
| 2019/0190894 A1 * | 6/2019 | Kapoor | H04L 67/02 |
| 2019/0220831 A1 | 7/2019 | Rangarajan et al. | |
| 2019/0236571 A1 * | 8/2019 | Arora | G06Q 20/3829 |
| 2019/0253252 A1 | 8/2019 | Qiu | |
| 2019/0279215 A1 * | 9/2019 | Kuchar | G06Q 20/0655 |
| 2019/0333054 A1 * | 10/2019 | Cona | G06Q 20/383 |
| 2019/0355076 A1 * | 11/2019 | Marcinkowski | H04W 4/021 |
| 2019/0373137 A1 * | 12/2019 | Krukar | H04N 1/444 |
| 2020/0021446 A1 * | 1/2020 | Roennow | H04L 63/1458 |
| 2020/0058023 A1 * | 2/2020 | Travizano | H04L 9/3239 |
| 2020/0145373 A1 * | 5/2020 | Richardson | H04L 9/3297 |
| 2020/0314055 A1 | 10/2020 | Blinn | |
| 2020/0328883 A1 | 10/2020 | Kaizer et al. | |
| 2020/0382372 A1 | 12/2020 | Easwar Prasad et al. | |
| 2020/0403809 A1 | 12/2020 | Chan et al. | |
| 2021/0037013 A1 | 2/2021 | Salkintzis | |
| 2021/0135867 A1 | 5/2021 | Zeng et al. | |
| 2021/0304191 A1 * | 9/2021 | O'Grady | G06F 9/541 |
| 2022/0103370 A1 | 3/2022 | Alwen et al. | |
| 2022/0376889 A1 | 11/2022 | Kaizer et al. | |
| 2022/0376925 A1 | 11/2022 | Kaizer et al. | |

FOREIGN PATENT DOCUMENTS

| | | | |
|---|---|---|---|
| CN | 107705114 A * | 2/2018 | |
| CN | 108429765 A * | 8/2018 | H04L 61/10 |
| CN | 110012126 A * | 7/2019 | H04L 61/1511 |
| CN | 111600871 A * | 8/2020 | H04L 45/54 |
| CN | 112671950 A * | 4/2021 | |
| CN | 109981633 B * | 5/2021 | H04L 63/1441 |
| CN | 112765684 A * | 5/2021 | G06F 16/27 |
| CN | 109413228 B * | 6/2021 | H04L 61/1511 |
| EP | 2530909 A2 * | 12/2012 | G06F 13/00 |
| JP | 2021524978 A * | 9/2021 | |
| KR | 20220143705 A * | 10/2022 | |
| WO | WO-2017148245 A1 * | 9/2017 | G06F 21/10 |
| WO | 2018007828 A2 | 1/2018 | |
| WO | WO-2019078879 A1 * | 4/2019 | G06F 21/6218 |
| WO | WO-2019142049 A1 * | 7/2019 | G06F 16/137 |
| WO | WO-2020150741 A1 * | 7/2020 | G06Q 20/065 |
| WO | 2022/246189 A1 | 11/2022 | |
| WO | 2022/246193 A1 | 11/2022 | |

OTHER PUBLICATIONS

Domraider, "ICO Whitepaper," www.domraider.io, SIRET 79417114000013 [retrieved on Aug. 25, 2019]. Retrieved from the Internet: URL:https://s3-eu-west-1.amazonaws.com/domraider/domraider/DomRaider+ICO+Whitepaper+EN.pdf pp. 1-127.

Johnson, N., "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

Moosavi, "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019]. Retrieved from the Internet: URL:https://pdfs.semanticscholar.org/7e38/b0c0e6f7066de9821b8fab6a489a 79907 44f.pdf pp. 1-92.

Tarasov, P. "Internet Voting Using Zcash," University of Dublin, Trinity College, May 2017 [retrieved on Aug. 25, 2019]. Retrieved from the Internet: URL:https://scss.tcd .ie/publications/theses/diss/20 17/TCD-SCSS-DISSERTATION-2017-015.pdf pp. 1-89.

International Preliminary Report on Patentability issued in International Application No. PCT/US2019/038447 on Jan. 7, 2021, pp. 1-13.

Notice of Allowance issued in U.S. Appl. No. 16/024,488 on Mar. 13, 2020, 30 pages.

Office Action issued in U.S. Appl. No. 16/402,047 on Feb. 1, 2021, 14 pages.

Office Action issued in U.S. Appl. No. 16/402,047 on May 11, 2021, 9 pages.

Office Action issued in U.S. Appl. No. 16/515,825 on Apr. 15, 2021, 14 bages.

Office Action issued in U.S. Appl. No. 16/402,047 on Aug. 9, 2021, 10 pages.

Office Action issued in U.S. Appl. No. 16/515,825 on Sep. 20, 2021, 19 pages.

Baritz et al., ID4me—Technical White Paper Draft, Version 14, Feb. 28, 2020, 39 pages.

Bertola, V., ID4me, Technical overview, Version 1.4, Oct. 4, 2019, 16 pages.

Bertola, V., ID4me, General Overview, Version 1.3, Oct. 6, 2019, 5 pages.

Dan.com, "Domain Industry, Let us Innovate.", Retrieved from the Internet: https://blog.undeveloped.com/domain-Industry-join-us-in-becoming-innovative-thriving-again-a751d2e17ae9, Nov. 21, 2017 [retrieved on Sep. 17, 2021], pp. 1-6.

DNS Registrar guide—Ethereum Name Service, Retrieved from the Internet on Sep. 22, 2021: https://docs.ens.domains/dns-registrar-guide, pp. 1-5.

Einarrson, B., "[DNSOP] Verifying TLD operator authorisation," Retrieved from the Internet: https://mailarchive.ietf.org/arch/msg/dnsop/qaDjnArp98T0glBYQbUfswwaxrg, Jun. 18, 2019 [retrieved on Sep. 17, 2021], 1 page.

Hollenbeck, S., "Extensible Provisioning Protocol (EPP) Domain Name Mapping," RFC 4931, Retrieved from the Internet: https://datatracker.ietf.org/doc/html/rfc4931, May 2007 [retrieved on Sep. 7, 2021], pp. 1-46.

Hollenbeck, S., "Extensible Provisioning Protocol (EPP)," RFC 5730, Retrieved from the Internet: https://datatracker.ietf.org/doc/html/rfc5730, Aug. 2009 [retrieved on Sep. 7, 2021], pp. 1-67.

Hollenbeck et al., "Security Services for the Registration Data Access Protocal (RDAP), " RFC 7481, Retrieved from the Internet: https://tools.ietf.org/html/rfc7481, Mar. 2015 [retrieved on Sep. 7, 2021], pp. 1-13.

Johnson, N., "[DNSOP] Verifying TLD operator authorisation," Retrieved from the Internet: https://mailarchive.ietf.org/arch/msg/dnsop/AX5D3cqSTWF69pAWqu5Pn6SGXDs, Jun. 14, 2019 [retrieved on Sep. 17, 2021], 1 page.

(56) References Cited

OTHER PUBLICATIONS

Johnson, N., "ENS Root Change Will Allow Easy Integration of More Than 1300 DNS TLDs," Retrieved from the Internet: https://medium.com/the-ethereum-name-service/upcoming-changes-to-the-ens-root-a1b78fd52b38, Feb. 25, 2019 [retrieved on Sep. 7, 2021], 4 pages.

Johnson, N., "Introducing .luxe on ENS," Retrieved from the Internet: https://medium.com/@weka/introducing-luxe-on-ens-35a9ee2383ce, Oct. 2, 2018 [retrieved on Sep. 7, 2021], 4 pages.

Kuhl, R., "[DNSOP] Verifying TLD operator authorisation," Retrieved from the Internet: https://mailarchive.ietf.org/arch/msg/dnsop/DQEjRQZAafeGoMckNTt5GxSTe9g, Jun. 14, 2019 [retrieved on Sep. 17, 2021], 1 page.

Millegan, B., "ENS + .KRED: Major Integration of DNS and ENS Launches," Retrieved from the Internet: https://medium.com/the-ethereum-name-service/ens-kred-major-integration-of-dns-and-ens-launches-e7efb4dd872a, Feb. 19, 2020 [retrieved on Sep. 7, 2021], 3 pages.

Millegan, B., "Ethereum Name Service," Retrieved from the Internet on Sep. 7, 2021: https://vir.isi.edu/events/dinr2020/S/blantly-ENS.pdf, 24 pages.

Millegan, B., "Linking DNS with blockchain-based ENS records," Retrieved from the Internet on Sep. 7, 2021: https://conso.icann.org/sites/default/files/field-attached/presentation-dns-blockchain-ens-24jun19-en.pdf, 31 pages.

Monster, R., "Domain Leasing : How we do it at Epik, and how you can too!," Retrieved from the Internet: https://www.epik.com/blog/leasing-domains-how-we-do-it-at-epik-and-how-you-can-too.html, Mar. 27, 2020 [retrieved on Sep. 7, 2021], 14 pages.

Verisign, Inc., "Ethereum Name Service (ENS) Root Change Issues," Verisign Technical Note, Retrieved from the Internet: https://www.verisign.com/assets/labs/ens-root-change-issues-5.2020.pdf, Apr. 12, 2019 [retrieved on Sep. 22, 2021], pp. 1-2.

International Search Report and Written Opinion for Application No. PCT/US2022/030241, dated Oct. 6, 2022, 8 pages.

International Search Report and Written Opinion for Application No. PCT/US2022/030248, dated Oct. 6, 2022, 6 pages.

U.S. Notice of Allowance for U.S. Appl. No. 17/325,687, dated Apr. 17, 2023, 25 pages.

\* cited by examiner

BLOCKCHAIN NETWORK IDENTIFIER CLAIMING USING REGISTRATION STATUS REQUESTS

FIELD

This disclosure relates generally to blockchains, and, more particularly, blockchain addresses.

BACKGROUND

A network identifier infrastructure system may assign network identifiers to network resources present at network addresses. Network identifiers may include alphanumeric strings. For example, network identifiers may include human-readable names. Examples of network identifiers include internet domain names, social media handles, telephone numbers, email addresses, and digital object architecture handles. Network identifiers may be organized in a hierarchy, with top level network identifiers at the top, and any number of network identifiers below them in the hierarchy. The network resources to which such network identifiers are assigned by the network identifier infrastructure system may be any of a variety of network resources, such as network-connected computers, social media accounts, telephone connections, email servers, or digital object architecture objects. For example, an assignment may associate a network identifier with a network address for a network resource. The network addresses may be in the form of numerical labels, for example, internet protocol (IP) addresses or blockchain addresses (described further below). Such numerical labels may be difficult for typical humans to remember. Thus, network infrastructure systems may, for example, assign human-friendly network identifiers to network resources present at network addresses that are inconvenient for humans to retain and utilize.

A particular type of network identifier infrastructure system is a domain name system (DNS). The term domain name system (DNS) may refer to, for example, a network identifier infrastructure system, such as a hierarchical distributed network identifier infrastructure system, for resources provided by computer servers that are connected to the internet. A DNS may associate a network identifier, such as domain name, to a network address, such as a numeric internet protocol (IP) address, of an internet resource. A DNS may thus allow computers to access networked resources, including web pages, using the assigned names.

In general, network infrastructure information (e.g., associations of network resources with network identifiers, public keys of asymmetric key pairs, signatures, etc.) may be stored in network infrastructure records. Further, network identifier infrastructure systems may include one or more authoritative record keepers or authoritative record entities. For example, a network identifier infrastructure system may include a network-accessible authoritative database that stores multiple network infrastructure records. Such an authoritative database may provide network infrastructure records to other, e.g., non-authoritative, network-accessible databases in the network. Some network identifier infrastructures are hierarchical, e.g., an authoritative record keeper or authoritative record entity may provide network infrastructure records to network-accessible databases that are under the authoritative record keeper or authoritative record entity in the hierarchy. Some such network identifier infrastructure systems may be structured such that an authoritative record keeper or authoritative record entity provides network infrastructure records to segments of the network, e.g., to portions of the network identifier namespace. For example, such a network identifier infrastructure system may provide to a respective database for that segment a network segment file, which may include network infrastructure records for resources that are present in that particular network segment.

An authoritative record keeper or authoritative record entity, such as in the context of a DNS, may be referred to as, for example, a registry. A registry may include an authoritative, master database of domain names registered under a top-level domain, or other domain in which domain names can be registered. A registry may include many hardware computer servers operably coupled to the internet. For ease of discussion, a registry may be identified with its computer servers and systems. Further, such as in the context of a DNS, network infrastructure records may be referred to as resource records, a network segment may be referred to as a zone, and a file of resource records for a particular zone may be referred to as a zone file.

Network identifier infrastructure systems may utilize registration facilitators or registration entities to register network identifiers to entities referred to as registrants. For example, a registration facilitator or registration entity may act as an intermediary between an authoritative record keeper or authoritative record entity and a person or end user entity that wishes to register a network identifier. The registration facilitator or registration entity may charge a fee to the registrant and convey registration information, e.g., the network identifier and a network address to which it is to be associated, to an authoritative record keeper or authoritative record entity. The authoritative record keeper or authoritative record entity may update its records accordingly. According to some networks, registrants are unable to directly interact with authoritative record keepers or authoritative record entity, and instead interact through registration facilitators or registration entities.

In the context of a DNS, a registration facilitator or registration entity may be referred to as a registrar. Registrars may facilitate registration of domain names to registrants in the DNS. Registrars may compete with one another to register domain names for registrants through the DNS registry. For example, an internet user may interact with a registrar to register a domain name, thereby becoming a registrant for the domain name. Registrars may include many hardware computer servers. For ease of discussion, a registrar may be identified with its hardware computer servers unless otherwise specified or clear from context. Further, for ease of discussion, a registrant may be identified with its hardware client computer unless otherwise specified or clear from context.

The term network identifier infrastructure operator may refer to an authoritative record keeper or a registration facilitator, for example. Similarly, the term DNS operator may refer to a registry or registrar, for example.

An electronic ledger that records transactions may be referred to as a blockchain. Such transactions may include, for example, but are not limited to, cryptocurrency transactions. In general, a blockchain may be implemented as a decentralized distributed readable and writeable computer interpretable data structure, stored in various computers (e.g., nodes) in a blockchain network (e.g., a cryptocurrency network). A blockchain may be constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of one or more transactions, a transaction identifier, a transaction amount, and the address associated with the receiving party (e.g., associated with the receiving party's public key).

Blockchain users may have an associated blockchain address and/or cryptographic key pair, e.g., an asymmetric cryptographic key pair. Such a key pair may be referred to as the user's blockchain key pair that includes or consists of a public key (e.g., usable by the user to receive cryptocurrency) and a private key (e.g., usable by the user to send cryptocurrency). Each blockchain user may have a blockchain address that may serve as the user's identifier for purposes of the blockchain. For example, the blockchain address may be derived from the public key of the user's blockchain key pair, e.g., by applying a hash function. A first blockchain user may receive cryptocurrency from a second blockchain user, for example, who utilizes a blockchain address of the first blockchain user.

SUMMARY

Various embodiments include systems, methods, and computer products and media for associating a blockchain address with a network identifier. In various implementations, the systems, methods, and computer products may perform, execute or enable operations, functions, and/or behaviors that include: receiving, over a computer network and by a network identifier infrastructure operator, a request for a registration status of the network identifier; retrieving, by the network identifier infrastructure operator, an association of the network identifier with the blockchain address; obtaining a signed association of the network identifier with the blockchain address, wherein the signed association is signed by a private key of a key pair of the network identifier infrastructure operator; and providing, over the computer network and by the network identifier infrastructure operator, the signed association of the network identifier with the blockchain address.

In some embodiments, the network identifier may include an internet domain name.

In some embodiments, the network identifier infrastructure operator may comprise a Domain Name System (DNS) registry.

In some embodiments, the request for the registration status of the network identifier may include one of: a Registration Data Access Protocol (RDAP) request, a Repository-based Data Dissemination (RDD) protocol request, or a WHOIS request.

In other embodiments, the operations, functions, and/or behaviors may also include: receiving, from a network identifier registration facilitator, on behalf of a holder of the network identifier, and by the network identifier infrastructure operator, a storage request representing the blockchain address and the network identifier; and storing, in the persistent electronic memory and by the network identifier infrastructure operator, a representation of the association of the network identifier with the blockchain address. In such embodiments, the storage request may include a datum signed by a private key of a key pair (e.g., an asymmetric key pair) of the identifier holder.

In some embodiments, obtaining the signed association may include signing, by the private key of a key pair of the network identifier infrastructure operator, at least the association of the network identifier with the blockchain address, to produce at least a signed association of the network identifier with the blockchain address.

In some such embodiments, signing, by the private key of the key pair of the network identifier infrastructure operator, at least the association of the network identifier with a blockchain address may further include: signing, by the private key of the key pair of the network identifier infrastructure operator, a unique identifier for preventing replay attacks.

In various embodiments, receiving, over the computer network and by the network identifier infrastructure operator, the request for a registration status of a network identifier may include: receiving, over the computer network and by the network identifier infrastructure operator, the request from an electronic wallet of a blockchain user engaging in a blockchain transaction with an owner of the blockchain address.

In other embodiments, the network identifier infrastructure operator is configured to respond to a request for a registration status of a second network identifier that is not associated with a blockchain address in the electronic persistent memory by: signing, by the private key of the key pair of the network identifier infrastructure operator, an error message comprising at least the network identifier to produce a signed error message; and providing, over the computer network and by the network identifier infrastructure operator, the signed error message.

In yet other embodiments, the request for a registration status of a network identifier may further identify the message portion to be signed; and the obtaining a signed association of the network identifier with the blockchain address may further comprise: signing, by the private key of the key pair of the network identifier infrastructure operator, at least the association of the network identifier and the message portion to be signed.

In various system implementations, the system may include: a memory containing instructions; and a processor, operably connected to the memory, that executes the instructions to perform, execute, or enable the operations, functions, and/or behaviors described herein.

It is intended that combinations of the above-described elements and those within the specification may be made, except where otherwise contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
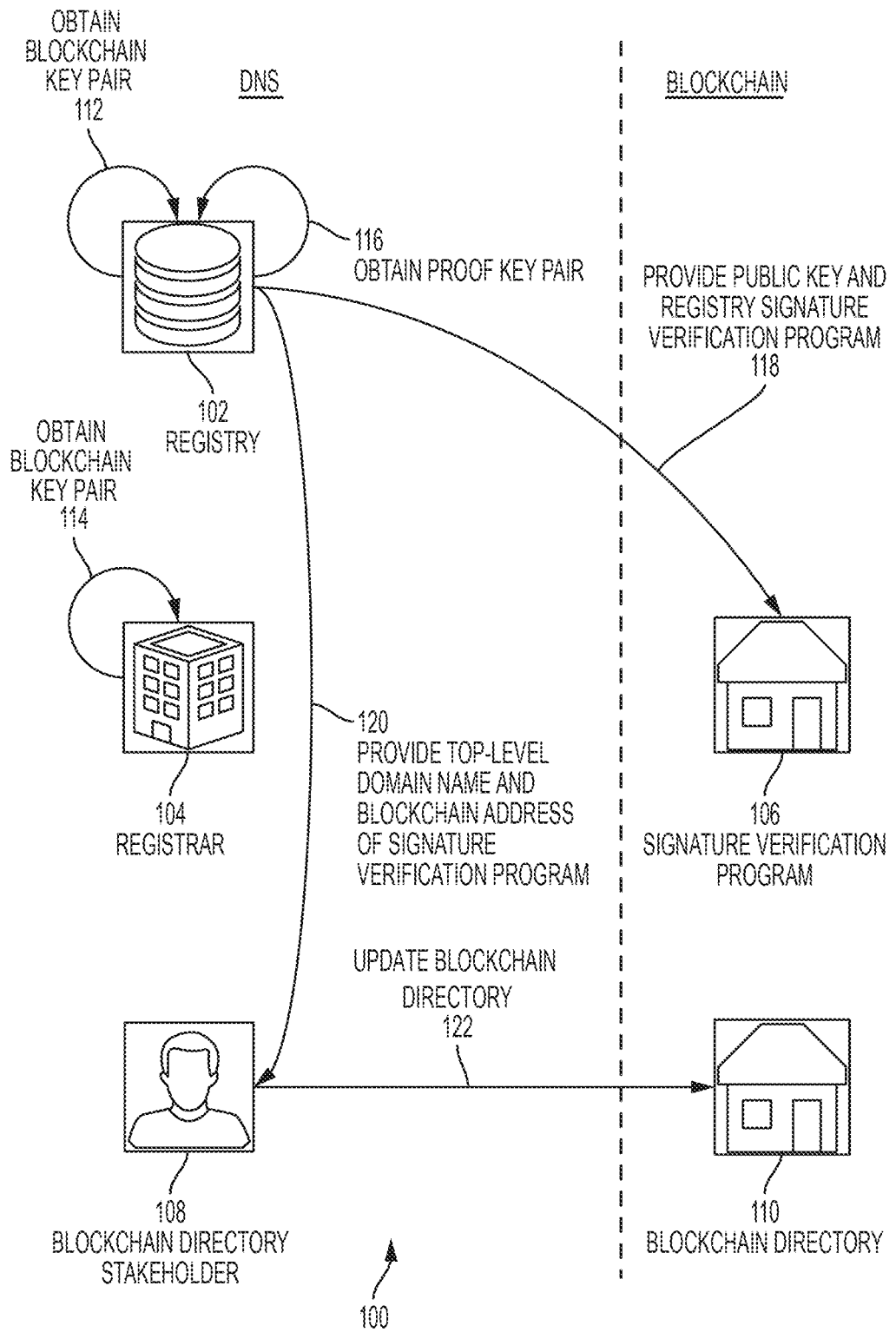
FIG. 1 is a schematic diagram of a setup technique for preparing to associate blockchain addresses with domain names according to various embodiments.

Reference will now be made in detail to example implementations, illustrated in the accompanying drawings.

Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Some embodiments provide the ability to use a network identifier as a blockchain address. For example, in the context of a DNS, some embodiments associate a domain name registered in a traditional DNS environment (e.g., at a registrar) in a blockchain environment with a blockchain address. For example, if a registrant has registered example.com, the registrant may associate it with, and be able to use it instead of its blockchain address. Such association enables a human friendly way to interact with other blockchain users by using a domain name as an address instead of numbers, such as a blockchain address. Further, such association permits a blockchain user to utilize its web presence, e.g., example.com, as its blockchain presence. For example, from the user's perspective in interacting with a blockchain through software, a domain name may be used instead of the blockchain address to which it is associated. For example, a first user may send cryptocurrency to a second blockchain user by specifying a cryptocurrency amount and the second user's domain name to a blockchain interface, e.g., a wallet (described further below). Thus, the association permits blockchain users to utilize their unique identifier or web presence, e.g., example.com, instead of their blockchain address or blockchain presence.

An association of a network identifier such as a domain name with a blockchain address may be implemented at least in part by storing a representation of the association, e.g., in a location accessible by the blockchain, such as in the blockchain itself. The association may be stored in a table, for example, where one column in the table stores a representation of the network identifier (e.g., the network identifier itself) and another column stores the associated blockchain address. Additional columns may store additional information according to various embodiments. The arrangement of the columns may appear in any order. Alternately, or in addition, the association may be stored in the form of a tuple, e.g., <network identifier, blockchain address>. Such a form of association storage is not limited to doubles; additional elements may be included to such tuples according to various embodiments, e.g., <network identifier, blockchain address, first other data, second other data, . . . >. The elements of such tuples may appear in any order. From the perspective of a blockchain user, the stored association may not be visible, but such a user may use its network identifier instead of its blockchain address, e.g., in interacting with blockchain software.

At a high level, some embodiments may include three phases. First, a setup phase creates and/or provisions components in both the DNS and blockchain environments. Second, a DNS-environment execution phase associates the domain with the blockchain address at the DNS registry. Third, a push execution phase pushes a domain name from the DNS environment into the blockchain environment, e.g., at the request of the registrant.

Embodiments include many innovations, benefits, and technical advantages. For example, some embodiments establish a direct approach for registrants to utilize their DNS domain names in a blockchain network. To that end, some embodiments insert an executable program, a signature verification program, described in detail herein, into the blockchain. According to an embodiment, the signature verification program may be provided by and possibly maintained by a respective registry for the associated top-level domain. According to some embodiments, maintenance of the signature verification program is delegated to another entity.

As another example, some embodiments add a new functionality to a system to access registration data, such as the Registration Data Access Protocol (RDAP). In such embodiments, RDAP is used to obtain associations of domain names with blockchain addresses from the DNS registry or other DNS operator. Any entity can obtain a RDAP record signed by a registry or other DNS operator. Further, using such an RDAP record, any entity can push such a record into the blockchain environment, where the registry's signature is verified by the signature verification program before the association is stored in the blockchain. This verification may ensure that only registry-approved associations can be added to the blockchain. This is advantageous because many blockchains do not allow for external network connections to be established to fetch or retrieve information, e.g., a public key to use for validation purposes. External network connections are prevented because external sources may risk breaking the blockchain nodes' ability to rely on the same information, e.g., an external network may go offline or provide different answers to different nodes which would break the blockchain network's ability to reach consensus. The cryptographic key approach, such as use of cryptographic asymmetric keys, resolves this by supplying a public key in such a way that the entire blockchain has access to it. For example, in some embodiments, the public key is provisioned during the creation of the signature verification program. Therefore, confusion is avoided in the blockchain network about how to validate signed messages, and a consensus can be reached.

According to various embodiments, usage of DNS Security (DNSSEC) is not required. According to various embodiments, delegating a domain name into a zone may not be required. For example, DNSSEC may not be required to prove domain control if RDAP signatures are supported as disclosed herein, and zone delegation may not be required because the RDAP extension disclosed herein can respond to registry database information even if not in the DNS zone.

Although the embodiments are described in reference to FIGS. 1-4 as being implemented to associate domain names with blockchain addresses using a DNS registry with extended RDAP functionality and registrar, embodiments are not so limited. For example, embodiments may be used to associate any network identifier with a blockchain address. Such network identifiers include, by way of non-limiting example, social network handles, email addresses, telephone numbers, other systems that use unique identifiers, etc. As another example, embodiments are not limited to RDAP. Instead, embodiments may utilize alterations of any protocol or system that accesses identifier registration status information, e.g., WHOIS, any Repository-based Data Dissemination (RDD) protocol, etc.

These and other features and advantages are described in detail herein.

II. Setup Phase

FIG. 1 is a schematic diagram of a setup technique for preparing to associate blockchain addresses with domain names according to various embodiments. Setup method 100 may be performed to establish and configure the hardware, software, and protocol components used to perform the methods shown and described below in reference to FIGS. 2-4. The left-hand side of the diagram depicts the DNS environment, and the right hand side depicts the blockchain environment.

Setup method 100 may begin with registry 102 obtaining 112 a blockchain key pair and registrar 104 obtaining 114 a blockchain key pair. These blockchain key pairs are the registry's 102 and the registrar's 104 blockchain keys, which they may use to perform blockchain transactions. According to an embodiment, registry 102 and registrar 104 may each obtain a respective address instead of a respective blockchain public key according to some embodiments. Registry 102 and registrar 104 may obtain their respective blockchain key pair (or respective private key and address) by generating their respective blockchain key pair themselves, or by acquiring their respective blockchain key pair from a different entity, such as a certification authority.

According to some embodiments, registry 102 and registrar 104 may obtain their respective blockchain key pair (or respective private key and address) through the use of, or by acquiring, a respective electronic wallet. For example, the wallet may be a computer executable software program or application that facilitates interactions with a blockchain network. The wallet may execute on a user device such as a personal computer or a smart phone. The wallet may be used in a cryptocurrency blockchain network to facilitate the sending and receiving of cryptocurrency with other users in the blockchain network. A standard wallet may have built-in user-callable functionality to generate blockchain key pairs (or private keys and addresses) and send and receive cryptocurrency. A wallet, as contemplated herein, may have additional functionality as described further herein.

Further, registry 102 may add support for an extension of RDAP. For example, such an extension may provide for including a blockchain address associated with a domain name in response to an RDAP query. According to some embodiments, the RDAP extension may return such associated blockchain addresses in one or more JavaScript Object Notation (JSON) objects. Further, such an RDAP extension may provide for the querier an option to specify in the RDAP query the portion of the response that is to be signed by the registry. According to some embodiments, the registry 102 always signs some portion of the response, e.g., the blockchain address associations, in addition to any portions specified by the requestor. Thus, according to some embodiments, the associations may be included in a dedicated signed JSON object. As part of setting up the RDAP extension, registry 102 obtains 116 (e.g., generates) a proof key pair. For example, a proof key pair may be a cryptographic asymmetric key pair, of which the private key may be used to sign all or part of the RDAP responses, as specified by the querier and/or registry 102.

In use, once registry 102 establishes the RDAP extension, any entity may request an RDAP response from registry 102. The request may include a domain name for which the RDAP data is to be retrieved and may specify that at least the associated blockchain address, if any, be signed.

To respond to the request, registry 102 may retrieve the relevant RDAP records, then form a message and sign the portion for which a signature is to be included (e.g., per the request of the querier and/or per standard procedure for registry 102) or retrieve or otherwise obtain a pre-signed message or representation thereof. According to some embodiments, registry 102 always signs a JSON object that sets forth the blockchain-address-domain-name association. According to some embodiments, each part of the RDAP response may be included in a separate JSON object, where the part of the response that is to be signed is included in one or more signed JSON objects.

According to some embodiments, if no associated blockchain address for the domain name exists, then registry 102 may return an error message. The error message may be an alteration of a standard 404 "Not Found" error. According to some embodiments, the error message may be signed using the private proof key of registry 102. According to such embodiments, an entity, such as a smart contract on the blockchain, may verify the signature on such an error message to authoritatively identify that no blockchain address is associated with the domain name that is the subject of the RDAP query.

According to some embodiments, the RDAP response may have an expiration attached to it by registry 102. Such an expiration may be in the form of a time and date after which the RDAP response is not considered valid, an issuing time and date, or a sequence number. The expiration information may be included in a signed portion of the RDAP response message, e.g., in a JSON object. The inclusion of expiration information ensures a replay attack is prevented, e.g., to prevent stale blockchain address associations when the (former) registrant has transferred the domain to a different registrant. A registry policy may specify (e.g., include) a time limit, and the time limit may be on the order of one, two, three, or more days, or coextensive with the expiration of the domain name's registration, for example.

Further, according to setup method 100, registry 102 may provide 118 a computer executable signature verification program 106 to the blockchain network for inclusion in a block in the blockchain. Signature verification program 106 may be in the form of a blockchain smart contract according to some embodiments. Registry 102 includes a copy of the public key of its proof key pair in the signature verification program. In operation, signature verification program 106 performs a signature verification algorithm defined by its computer executable code. The signature verification algorithm accepts as input data that includes at least an electronic signature, determines whether the signature is valid using the public key, and outputs a response indicating whether or not the signature is valid.

1. Input: data, signature on the data, and public key;
2. Apply public key to signature;
3. Check whether signature is valid (by way of non-limiting example, determine whether hash of data matches the public key as applied to the signature);
4. Output: results of determination at step 3.

Example Signature Verification Algorithm

According to an embodiment, the signature verification program 106 on the blockchain may serve as the entry point to associate a domain name with a blockchain address in the blockchain environment, where the association is already recorded in the DNS environment. Once a node in the blockchain adds signature verification program 106 to a block in the blockchain per the request of registry 102, registry 102 receives back an address of the blockchain indicating where the signature verification program 106 is stored in the blockchain. This address serves as a blockchain address for the signature verification program 106.

According to setup method 100, some embodiments account for blockchain networks that have existing name services. Some blockchain networks permit users to use names having particular specified formats as their blockchain addresses. Such associations may be held in a directory, such as blockchain directory 110. Blockchain directory 110 keeps track of which blockchain addresses have control over which names in the blockchain network, that is, the associations of names with blockchain users. According to some embodiments, blockchain directory 110 is embodied by, or utilizes, a non-transitory computer executable blockchain name services program stored in a block of the blockchain. According to such embodiments, the blockchain name services program is a smart contract. In operation, the blockchain name services program may accept as input a command to associate a name with a specified blockchain address, along with a specified name, and may store a record of such association upon processing such command. Alternately, or in addition, blockchain directory 110 may include or utilize a table of associations between names and blockchain addresses.

For embodiments in which the blockchain network does not include an existing name services framework, such a framework may be added to handle domain names associated with blockchain addresses per some embodiments. The added framework may include a blockchain name services program as described herein and/or a blockchain directory such as blockchain directory 110.

Thus, according to some embodiments, to account for blockchain networks that have existing name services, registry 102, or a representative thereof, provides the top-level domain names(s) over which it has registration authority (e.g., the top level domains dot com, dot net, dot edu, etc.), along with the blockchain address of the signature verification program 106, to the blockchain directory stakeholder 108 (e.g., owner or manager). Blockchain directory stakeholder 108 may then update 122 blockchain directory 110 with the provided information, for example, with information indicating that the top-level domain names are owned, in the blockchain sense, by the signature verification program 106. Blockchain directory stakeholder 108 may perform such an update 122 by passing the top-level domain names(s) over which registry 102 has registration authority and the blockchain address of the signature verification program 106 to the name services program, which updates a record of the association.

According to some embodiments, to account for blockchain networks that have existing name services, instead of the providing 120 and the updating 122 described above, registry 102 may submit to the blockchain network for inclusion in the blockchain a message that includes the top-level domain name(s) (e.g., dot com, dot net, dot edu, etc.) for which registration is handled by registry 102 and the blockchain address of the signature verification program 106, signed by the private key of the blockchain key pair of registry 102. The message may be submitted to the blockchain network for inclusion in a block to indicate that registry 102 has, in a sense, conveyed a degree of control of the top-level domain name to the registry proof verification program at the provided blockchain address, at least for purposes of associating domain names under the top-level domain name with blockchain addresses in the blockchain network.

Finally, according to setup method 100, registrar 104 (or a trusted service provider) may add functionality to its website or service to enable a domain name registrant to sign in and request a domain name be associated with its blockchain address. This may include for example, but not limited to, adding, or reconfiguring an existing, user interface and adding functionality for fetching proofs from registry 102, and may also include functionality for registrar 104 to submit the proof to the blockchain.

III. DNS-Environment Execution Phase

Figure 2:
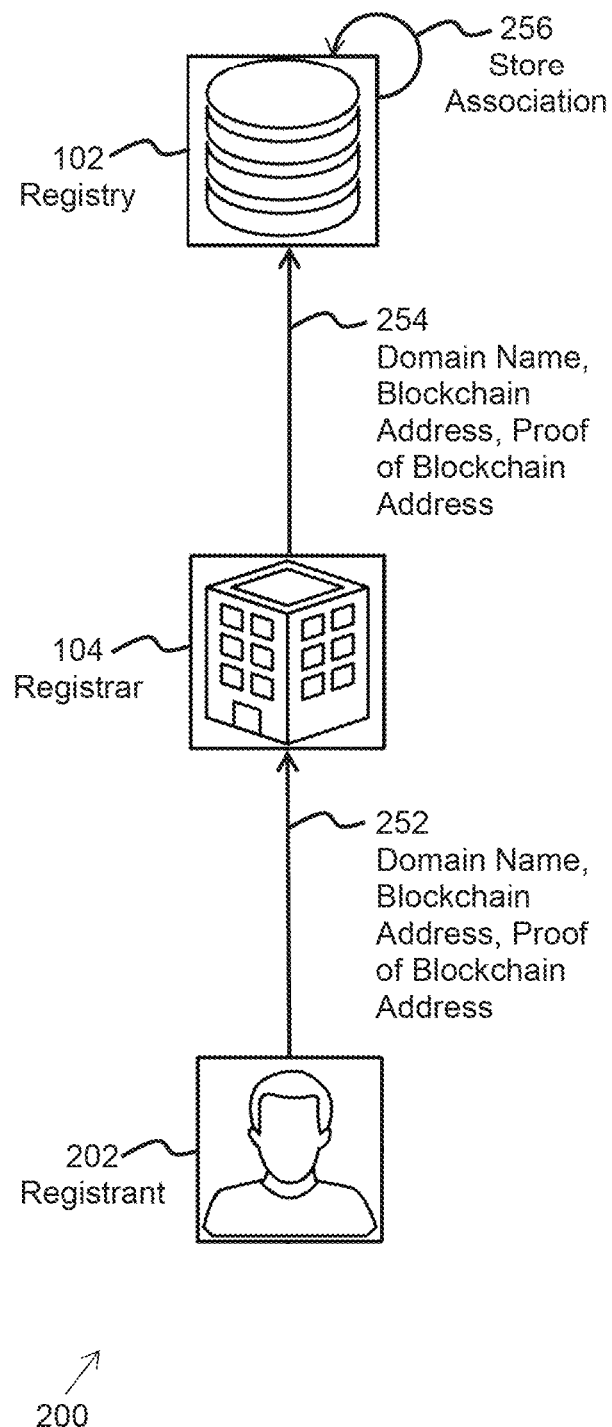
FIG. 2 is a schematic diagram of a method of associating blockchain addresses with domain names in a registry according to various embodiments.

FIG. 2 is a schematic diagram of a method 200 of associating blockchain addresses with domain names in a registry 102 according to various embodiments. For convenience, method 200 is described in reference to the same registry 102 and registrar 104 in FIG. 1. Method 200 may be initiated by a registrant, such as registrant 202. The actions performed by registrant 202 in method 200 may be performed through or by the registrant's wallet according to some embodiments.

To begin, registrant 202 may, according to some embodiments, form a proof of blockchain address control. To do so, registrant 202 may sign, using its blockchain private key, a message containing or representing the blockchain address of registrant 202 and the domain name of registrant 202. The proof of blockchain address control may include the blockchain public key and/or blockchain address of registrant 202 according to some embodiments. The proof of blockchain address control may include a representation of the blockchain address and/or domain name according to some embodiments, e.g., a hash of either or both data. The proof of blockchain address control may be verified by any entity by obtaining the blockchain public key of registrant 202, e.g., from the message itself or from blockchain, and using it to verify the signature. Verification may establish that the entity that controls the blockchain private key of registrant 202 (i.e., registrant 202) wishes to associate the blockchain address included in the message to the domain name included in the message.

Registrant 202 may initiate the DNS-environment association process by sending an association request 252 to registrar 104. Registrant may utilize a registrar-provided user interface or Application Program Interface (API) to deliver the association request 252 to registrar 104. For example, the association request message 252 may be sent using Extensible Provisioning Protocol (EPP), according to various embodiments. The association request message 252 may include the domain name and blockchain address for which association in the DNS environment is requested. In embodiments or configurations that utilize a proof of blockchain address control, such a proof may also be included with the request. The proof of blockchain address control may be a portion of association message 252 that includes the domain name (or representation thereof, e.g., a hash thereof) and blockchain address (or representation thereof, e.g., a hash thereof, or a blockchain public key of registrant 202), signed using the blockchain private key of registrant 202. According to some embodiments, the association request message 252 includes the blockchain public key of registrant 202.

Registrar 104 may receive the association request message 252 and parse it to form and send a registry association request message 254 to registry 102. The registry association request message 254 may include the domain name, the blockchain address, and for embodiments or configuration that utilize it, the proof of blockchain address control. Registrar 104 may, according to some embodiments, verify the proof of blockchain address control using the blockchain public key of registrant 202, e.g., by obtaining the blockchain public key of registrant 202 from the proof itself, from the association request 252, or from the blockchain. According to some embodiments, the registry association request message 254 includes the blockchain public key of registrant 202. The registry association request message 254 may be formed and sent to registry 102 using EPP according to some embodiments.

Next, registry 102 may receive the registry association request message 254. For embodiments or configurations that use a proof of blockchain address control, registry 102 verifies the signature using the blockchain public key of registrant 202. Registry 102 may obtain the blockchain public key of registrant 202 from the proof of blockchain address control, from the registry association request message 254, or from the blockchain. If the verification fails, then the process halts. Otherwise, if the verification is successful, or if no proof of blockchain address control is used, then registry 102 may store 256 the association of the blockchain address with the domain name. This data may be stored in the registry database in association with the domain name and, possibly, an identification of the respective blockchain. For example, an entry representing such an association may be in the form of an ordered triple, e.g., ([domain name], [blockchain address], [blockchain identification]).

This may complete the DNS-environment execution phase according to various embodiments.

IV. Push Execution Phase

Figure 3:
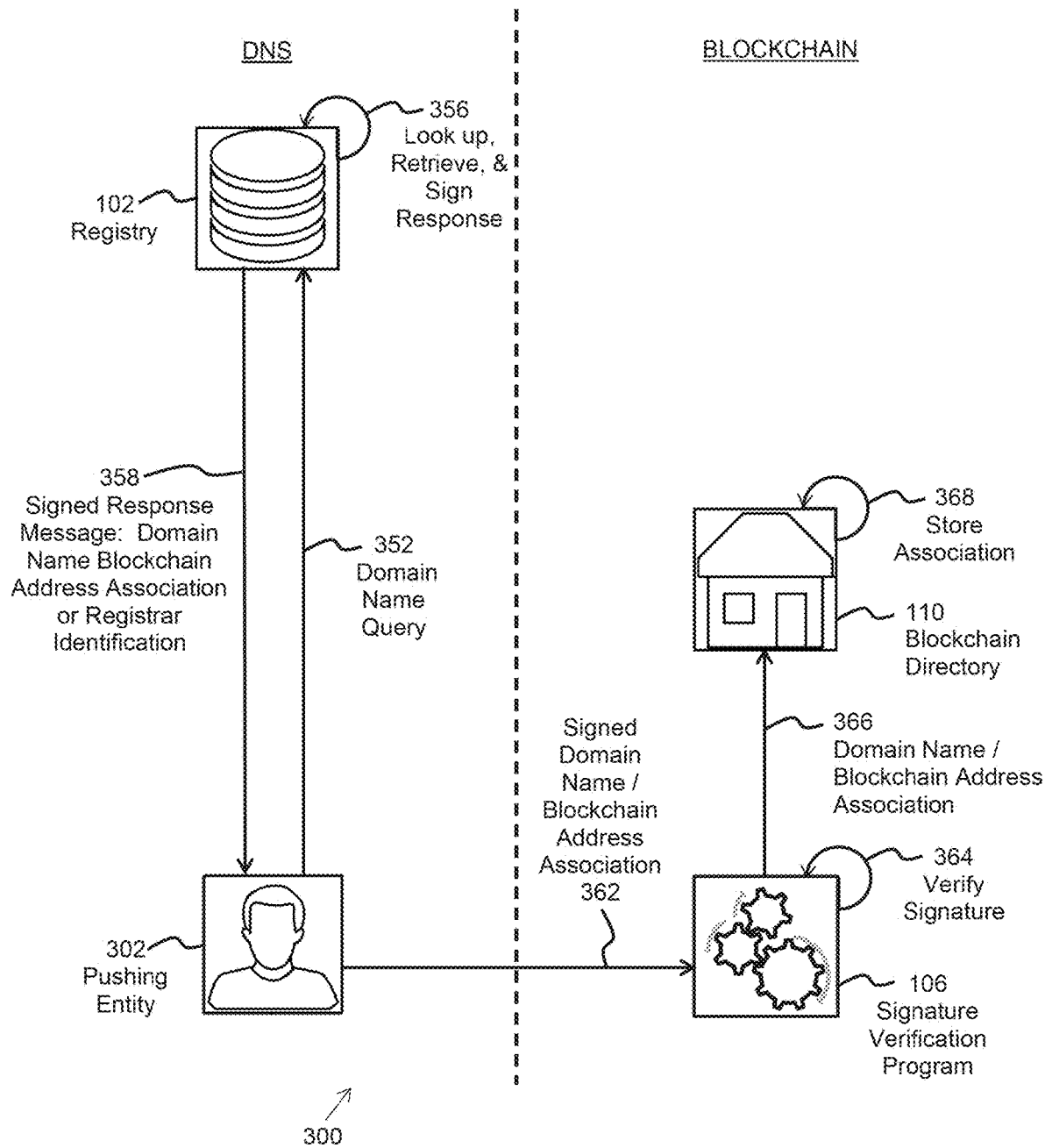
FIG. 3 is a schematic diagram of a method of pushing to a blockchain an association of a blockchain address with a domain name according to various embodiments.

FIG. 3 is a schematic diagram of a method 300 of pushing to a blockchain an association of a blockchain address with a domain name according to various embodiments. Once the association is stored by registry 102, any entity may obtain a signed representation of the association from registry 102 using the RDAP extension described above in Section I and push the association into the blockchain environment. Once present at registry 102 and interrogatable by RDAP, the information can be considered to be publicly disclosed. Thus, FIG. 3 depicts pushing entity 302, who may be registrant 202, registrar 104, registry 102, or any other entity.

To begin, pushing entity 302 may send a domain name query 352 to registry 102. Domain name query 352 may specify the domain name and represent a request to identify any associated blockchain address. Domain name query 352 may be requested via a registrar-provided user interface or API according to various embodiments. Domain name query 352 may be formed and sent per the RDAP extension described herein in Section I, for example.

Next, registry 102 may receive the domain name query 352 and may proceed to look up 356, retrieve, and sign (using the private key of the proof key pair) the requested information. According to embodiment, this process can differ depending on whether registry 102 is thick or thin.

Thick registries may store the relevant information in their own records. In that case, registry 102 may retrieve from its records any associated blockchain address(es) by using the domain name as a lookup key. Once a corresponding record is identified, registry 102 may parse the record to retrieve at least the associated blockchain address (and possibly also the associated blockchain identification). Registry 102 may form the signed response message 358 as including one or more JSON objects. At least a JSON object that includes an identification of the associated blockchain address may be signed using the private key of the proof key pair by default according to some embodiments. According to some embodiments, the entire contents of the signed response message 358 may be signed.

Thin registries may store information identifying a registrar that stores the relevant information. In that case, according to some embodiments, registry 102 may proceed to contact such a registrar to obtain any blockchain address associations. According to such embodiments, once registry 102 obtains the associations from the registrar, registry 102 may form and sign, in whole or in part, a message as described above in reference to thick registries. According to other embodiments, registry 102 may send a message to the registrar, requesting that it form and sign with its own proof key a message that includes the blockchain addresses. According to such embodiments, pushing entity 302 may receive such a message back from the registrar directly, or via registry 102. According to yet other embodiments, registry 102 may return an identification of the registrar that stores the relevant information back to pushing entity 302. Such an identification may be signed by a public key of a proof key pair of registry 102. The identification may comprise the registrar's name, a public key of the registrar, a blockchain address of the registrar, and/or a value derived from or associated with one or both of the foregoing). According to such embodiments, pushing entity 302 receives the identification, then proceeds to request the associations directly from the registrar, e.g., in the same manner as described herein in reference to a thick registry, but with the actions of the thick registry replaced by the actions of the registrar.

For these latter embodiments, the registrar may obtain the association from its own records, using the domain name as a search key as described in reference to the actions of a thick registry above. The registrar may proceed to sign the association, e.g., using a registrar proof key pair established during the setup phase. Likewise, during the setup phase, the registrar may convey a registrar signature verification program to the blockchain in a manner analogous to the signature verification program 106 for registry 102 described above in Section I. According to an embodiment, during the setup phase, the registrar may provision its public key of its registrar proof key pair in the signature verification program 106, e.g., via registry 102. Regardless as to how the registrar's public key is provisioned, the signed domain name/blockchain address association is returned to pushing entity 302, e.g., as an RDAP response message via a user interface or API.

For thick registries, as described above, and for embodiments where registry 102 obtains the blockchain address associations from a registrar or other entity, registry 102 proceeds to return the signed response message 358, including the signed domain name/blockchain address association, to pushing entity 302, e.g., via RDAP. In general, any suitable protocol for communicating with an authoritative record keeper in a network infrastructure system may be used. According to an embodiment, the signed response message 358 may include unsigned portions according to various embodiments.

Once pushing entity 302 receives the signed domain name/blockchain address association 360, pushing entity 302 may provide the signed domain name/blockchain address association 362 to signature verification program 106. Signature verification program 106 may verify 364 the registry's (and/or registrar's) signature on the message (e.g., on the association or on an identification of a registrar) using the public key of the registry's (and/or registrar's) proof key pair provisioned during the setup phase, depending on the particular embodiment. If not valid, then the process may halt, possibly with an error message conveyed from signature verification program 106 back to pushing entity 302. Otherwise, if the signature is valid, then method 300 may proceed as follows, depending on whether the registry's signature is on the association or on the registrar identification. If the registry's signature is on the association, then method 300 may store the association as described below. If the registry's signature is on the registrar's identification, then signature verification program 106 may proceed to verify the registrar's signature on the association, e.g., by sending the signature to a registrar signature verification program provided during the setup phase or by verifying the signature itself using a provisioned registrar public key of the registrar's proof key pair. If invalid, method 300 may halt. Otherwise, if the registrar's signature on the association is valid, then method 300 may store the association as described below.

To store the association in the blockchain environment, signature verification program 106 may request association of the domain name with the registrant's blockchain user address by sending the association 366 to blockchain directory 110. In embodiments where blockchain directory 110 includes an executable program such as a smart contract, the message may be in the form of a command to associate the domain name with registrant's new blockchain user address. According to such embodiments, the command may specify the domain name and the blockchain address of registrant 202. Consequently, blockchain directory 110 may store 368 the association between the domain name and the blockchain user address. The association 368 may be stored in a table, for example.

Method 300 may then end.

According to some embodiments, after the association is stored in the blockchain environment, registry 102 (or any other respective RDAP operator) may include such successful linkage information in future RDAP responses. Such information may be in the form of a note, for example, that indicates such storage. The RDAP operator can periodically check the blockchain for updates related to RDAP objects under its management and, for such objects that include associations, store the note in its RDAP records.

According to some embodiments, the operations of registrar 104 and registry 102 may be merged. For example, according to some embodiments, any DNS operator may institute the extended RDAP functionality described above in Section I. According to such embodiments, pushing entity 302 may interact directly with such a DNS operator. More particularly, pushing entity 302 may form an RDAP request message, such as a registry domain name query 354, and send it directly to the DNS operator, which processes it as described above and returns an associated blockchain address, e.g., as signed blockchain address association 358.

V. Example Use Case & System Components

Figure 4:
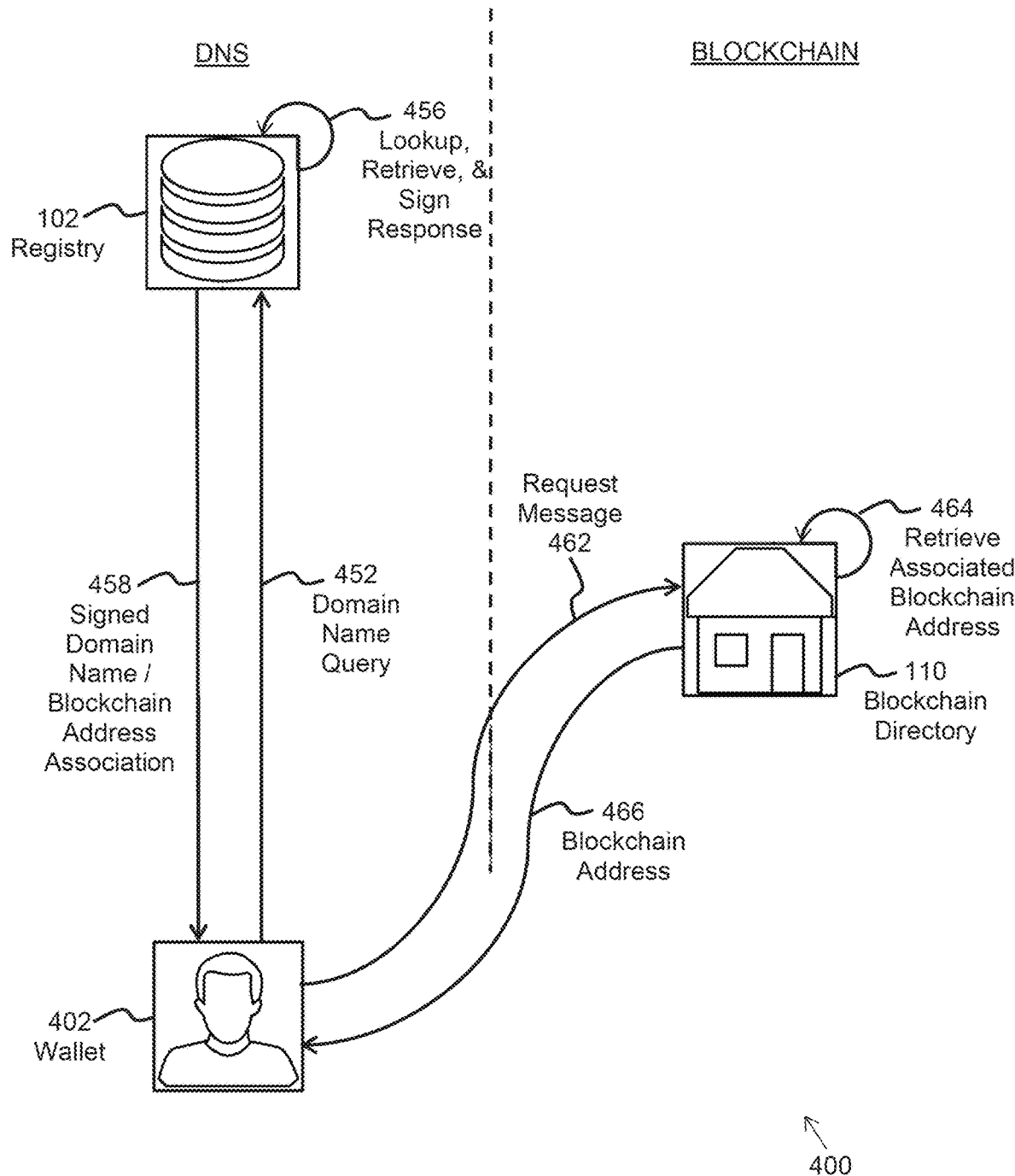
FIG. 4 is a schematic diagram of a method of confirming an association of a blockchain address with a domain name according to various embodiments.

FIG. 4 is a schematic diagram of a method 400 of confirming an association of a blockchain address with a domain name according to various embodiments. By way of non-limiting example, method 400 may be practiced by a first blockchain user, represented by wallet 402, that wishes to engage in a blockchain transaction with a second blockchain user. For example, the first blockchain user may use wallet 402 to send cryptocurrency to the second blockchain user. In particular, through the use of embodiments as described herein, the second blockchain user may associate a domain name (or other network identifier) with its blockchain address. As a use case of the results of such embodiments, the first blockchain user's wallet 402 may proceed to verify that the domain name is indeed correctly associated prior to conducting the transaction. In particular, wallet 402 may retrieve and compare association records from both registry 102 and blockchain directory 110. If they match, then they effectuate a second-factor confirmation for wallet 402. Otherwise, wallet 402 may recommend to the first blockchain user that the transaction not proceed, or even prevent the transaction from proceeding.

A description in reference to a thick registry, by way of a non-limiting example, follows. Wallet 402 may send a domain name query 452 (e.g., an RDAP query) to registry 102. Wallet 402 may specify in domain name query 452 that at least the association should be signed (e.g., by registry 104). Registry 104 may receive the query and proceed to look up 456 and retrieve the association in its records, e.g., using the domain name as a search key. Registry 102 may proceed to obtain a signed association, for example, by signing at least the association or a representation thereof, or by retrieving a pre-signed association or representation thereof, and return the signed domain name/blockchain address association 458 (or representation thereof) to wallet 402. After wallet 402 receives the signed domain name blockchain address association 458, wallet 402 may proceed to verify the signature using the public key of the registry's proof key pair. If the signature is valid, then wallet 402 at least temporarily stores the association in memory for purposes of comparing the association to the association retrieved from the blockchain.

A description in reference to a thin registry, by way of a non-limiting example, follows. Wallet 402 may send a domain name query 452 (e.g., an RDAP query) to registry 102. Wallet 402 may specify in domain name query 452 that at least the association should be signed. Registry 104 may receive the query and proceed to look up 456 and retrieve an identification of a registrar that stores the association in its records, e.g., using the domain name as a search key. Registry 102 may form a message that includes the identification, and may sign at least the identification using the private key of its proof key pair. Registry 102 may then provide the message to wallet 402. Wallet 402 may verify the signature, e.g., using the public key of the registry's proof key pair. If invalid, then the method may halt. Otherwise, wallet 402 may parse the message to obtain the identification of the registrar that stores the association. Wallet 402 may then send a request message, including the domain name or other network identifier, to the identified registrar, which proceeds to parse the message and look up the association, e.g., using the domain name as a search key. The registrar may then form and sign a message containing the association, e.g., using the private key of the registrar's proof key pair, and returns the signed message to wallet 402. After wallet 402 receives the signed domain name blockchain address association 458, wallet 402 may proceed to verify the signature using the public key of the registrar's proof key pair. If the signature is valid, then wallet 402 at least temporarily stores the association in memory for purposes of comparing the association to the association retrieved from the blockchain.

Wallet 402 may also retrieve or obtain the association from the blockchain, either before, during, or after it obtains the association from registry 102 or an authorized registrar, e.g., in the case of a thin registry. To do so, wallet 402 sends to the blockchain, e.g., to blockchain directory 110, a request message 462 that includes the domain name, requesting the associated blockchain address. Blockchain directory 110 retrieves or otherwise obtains 464 the associated blockchain address, and returns the retrieved blockchain address 466 to wallet 402.

Once wallet 402 obtains the blockchain address from both registry 102 and blockchain directory 110, wallet 402 may proceed to compare them. If identical (or consistent, e.g., if one of registry 102 and blockchain directory 110 provides a blockchain address, and the other provides a hash thereof), the wallet 402 proceeds with the requested transaction. Otherwise, if different, wallet 402 displays an error message and possibly refuses to complete the transaction.

Figure 5:
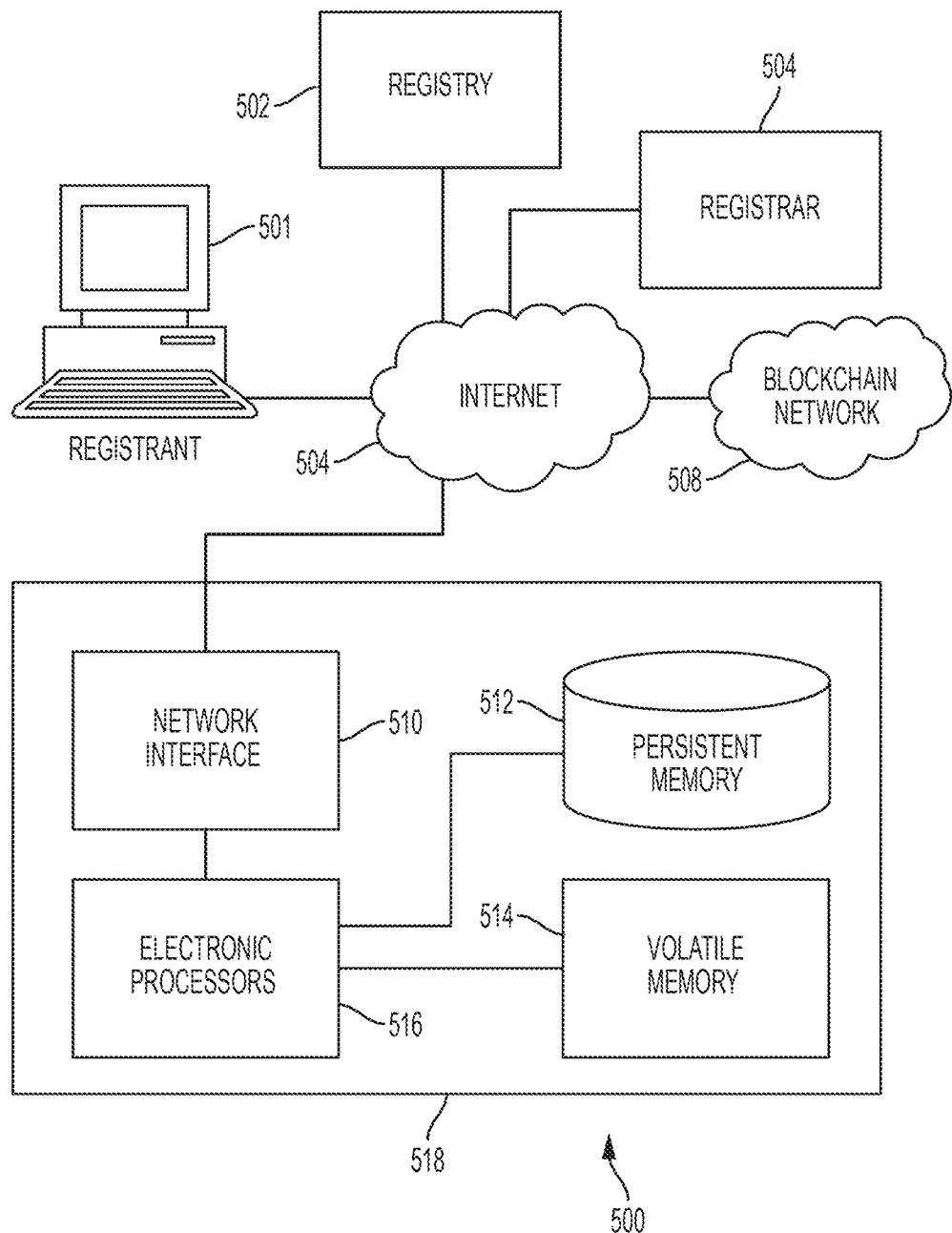
FIG. 5 is a schematic diagram of a system according to various embodiments.

FIG. 5 is a schematic diagram of a system 500 according to various embodiments. System 500 includes, for example, registrant 202 (identified with its computer), registry 102, registrar 104, and server computer 518, all communicatively coupled to the internet 504. System 500 may also include blockchain 508, which itself may be embodied by a plurality of networked nodes, which themselves may be networked through the internet 504. Server computer 518 may be, for example, a server computer of registry 102, registrar 104, or any DNS operator, according to various embodiments. Registry 102 may be merged with registrar 104, consistent with server computer 518 being either registry 102 or registrar 104, according to various embodiments. That is, FIG. 5 is intended to display the various components networked together, as well as the internal workings of a server computer consistent with the various, e.g., registry and registrar, servers disclosed herein.

Server computer 518 may include network interface 510 to communicatively couple to the internet 504. Network interface 510 may include a physical network interface, such as a network adapter. Server computer 518 may be a special-purpose computer, adapted for reliability and high-bandwidth communications. Thus, server computer 518 may be embodied in a cluster of individual hardware server computers, for example. Alternately, or in addition, server computer 518 may include redundant power supplies. Persistent memory 512 may be in a Redundant Array of Inexpensive Disk drives (RAID) configuration for added reliability, and volatile memory 514 may be or include Error-Correcting Code (ECC) memory hardware devices. Server computer 518 further includes one or more electronic processors 516, which may be multi-core processors suitable for handling large amounts of information. Electronic processors 516 are communicatively coupled to persistent memory 512, and may execute instructions stored thereon to at least partially effectuate the techniques, functions, and operations disclosed herein, e.g., method 100 as shown and described above in reference to FIG. 1, method 200 as shown and described in reference to FIG. 2, method 300 as shown and described in reference to FIG. 3, or method 400 as shown and described in reference to FIG. 4, and any variation, modification, or alternate methods as described in the following section. Electronic processors 516 are also communicatively coupled to volatile memory 514.

VI. Variations, Modifications, and Alternate Embodiments

Many variations on the disclosed embodiments are possible. Some example variations and modifications are presented below.

A. Alternatives to RDAP

Embodiments are not limited to the use of an RDAP extension as disclosed herein. Rather, any system or protocol that can store, retrieve, and sign identifier associations may be used. For example, the WHOIS protocol may be extended to store and return blockchain associations and provide signatures on returned associations. Similarly, any Repository-based Data Dissemination (RDD) protocol may be so extended.

B. Alternatives to Blockchain Addresses

Embodiments may be used for namespaces other than blockchain namespaces. For example, such embodiments may pass a network address for any network to a registrar to be included in an RDAP response (possibly along with proof of control of the network address, e.g., via a statement signed with network's private key).

C. Lower Level Domain Names

Some embodiments permit associating domain names that include second-level (and third or lower level) domain names with blockchain addresses in a blockchain network. In this context, for example, the highest level of the domain may be the top level domain or TLD, and the lower level domains are based on the hierarchy of the domain name. For example, an entity may register the domain name example.com, where ".com" is the highest or top level domain and "example" is the lower or second level domain. As such, the entity has also obtained authority to establish any valid domain names that include third or lower level domain names under the domain name example.com. Thus, the same entity may establish first.example.com, big.example.com, purple.example.com, subdomains of "example.com," etc. Such an entity may use method 200 and 300 to associate domain names that include third or lower level domain names under example.com with blockchain addresses for anyone, not limited to the entity itself. In effect, the entity acts as a registry for these names. Thus, the entity that has registered example.com may have a web-based business, for example, that provides blockchain name associations to its customers. The entity, rather than its customers, may receive a customer's existing blockchain address and proceed to use methods 200 and 300 to associate a domain name that includes a third or lower level domain name under example.com with the customer. Either the entity or the customer may choose the third level (and/or lower) domain name. According to an embodiment, because the entity has registered example.com, it can ensure that the registry of record proof procedure described herein is accomplished in order to associate blockchain addresses with such subdomain names.

An example use case of some embodiments is to provide control of a top level domain name. Such a use case may include use of a registry to identify an RDAP service of a top level domain operator. For example, an entity may send a query to a registry to get an identification of an RDAP service for a top level domain name specified in the query. According to some embodiments, the identification may be signed using a private key of a key pair of the registry (e.g., an asymmetric key pair), and the corresponding public key can be made public for the querying entity to verify the response. The entity could then send an RDAP query, specifying a top level domain name, to the identified RDAP service to obtain a response that includes a representation of a blockchain address to associate with the top level domain name, and a signature on the representation of the association of the blockchain address with the top level domain name.

D. Other Identifiers as Blockchain Addresses

Some embodiments associate a network identifier other than a domain name with a blockchain address in a blockchain network. Examples of such identifiers include, but are not limited to, social media handles, telephone numbers, email addresses, digital object architecture handles, and/or other network identifiers. Such embodiments may differ from the embodiments disclosed herein as follows. Registrant 202 may be understood to encompass the identifier holder, e.g., the social media user, telephone number owner, email address possessor, digital object architecture owner. The registry 102 may be understood to encompass the entity that provides and/or records the identifier, e.g., a phone company for a telephone number or an email provider for an email identifier. Registrar 104 may be understood to encompass any facilitating company or entity. The facilitating company or entity may have or may establish a communication channel with the entity that provides the identifier, e.g., the entity that provides the identifier has an internet-based interface or API.

For the setup phase of such embodiments, method 100 proceeds as disclosed above, except that the entity that provides and/or records the identifier performs the actions of registry 102, and the facilitating company or entity performs the actions of registrar 104. Analogous to registry 102 adding support for an RDAP extension, the entity that provides the identifier provides support for storing, retrieving, and signing blockchain associations, e.g., as described above in Section VI(A). The requests may be sent through the communication channel between the entity that provides the identifier and the facilitating company or entity. In such embodiments, the entity that provides the identifier may obtain and utilize a proof key pair as disclosed herein. The signature verification program 106 may be configured to verify the signatures by the entity that provides the identifier, as the signatures by registry 102 are verified. The signatures may be on data that specifies an identifier such as a social media handle, phone number, or email address and an existing blockchain address, instead of on data that specifies a domain name and an existing blockchain address.

For the DNS-environment execution phase and the push execution phase of such embodiments, the entity that provides and/or records the identifier performs the actions of registry 102, and the facilitating company or entity performs the actions of registrar 104. Registrant 202 may be understood to encompass identifier holder. Similarly, the pushing entity 302 may be the identifier holder (e.g., instead of registrant 202) that requests association of its identifier with a blockchain address in the blockchain environment. The facilitating company or entity receives the requests (e.g., 252 and/or 352) and requests that the association be stored by the entity that provides and/or records the identifier. Likewise, the entity that provides and/or records the identifier may respond to requests with signed associations of the identifier with a blockchain address.

According to some embodiments, the facilitating company or entity may be merged with the entity that provides and/or records the identifier. In such embodiments, the entity that provides and/or records the identifier may establish an interface or API that performs the analogous actions of registrar 104. Further, the signed association may be performed by the same entity. Such embodiments perform as described herein, except that communications 254, 354, and 358 are performed by different portions of the same entity, rather than by different entities.

Embodiments disclosed in this subsection may have the added benefit of enabling secure multi-factor identification by consulting the blockchain for a given blockchain network user's address to fetch additional factors for use to verify its identity. For example, if a given address on a blockchain has an attached social media handle, phone number, email address, digital object architecture handle, or other network identifier, those could be consulted on chain as a source to send a message to, to confirm proof of address ownership.

Further, embodiments disclosed in this subsection may be particularly beneficial to payment providers and their users. For example, a payment provider may be an entity that provides customer accounts to customers that permit such customers to send to and receive payment from other customers using customer identifiers instead of banking information. For example, a payment provider may enable its customers to send and receive money amongst themselves by specifying domain names and currency amounts. In particular, a first customer may log into a payment provider webpage interface by providing a domain name and password, then provide to the interface a domain name of a second customer, as well as a US dollar amount, along with instructions to pay, and the payment provider may respond to such instruction by moving currency between customer accounts as instructed. According to embodiments described in this subsection, a payment provider may associate an existing payment provider identifier (e.g., domain name) with blockchain address. In this way, a payment provider customer may broadcast, publish, or otherwise make known a central payment identifier, e.g., its domain name, along with instructions that the customer may receive payment through such identifier either by way of the standard techniques of the payment provider, or via cryptocurrency using a cryptocurrency blockchain network using the same identifier, e.g., domain name.

E. Generalized RDAP Responders

Some embodiments utilize an entity other than a registry to respond to RDAP requests as disclosed herein. For example, the entity that responds to RDAP requests as disclosed herein may be different from a registry, e.g., a registry may delegate authority to a third party service provider to respond to RDAP requests. Such delegation may be implemented according to a trust chain, for example. Further, the delegation may be passed to another entity, which may pass the delegation to yet another entity, and so on. For example, a registry may delegate to a registrar, which may delegate to a service provider. A trust chain may represent such delegations.

According to some embodiments, the signatures on RDAP responses as disclosed herein may be generated by an entity different from the RDAP responder. The RDAP responder may obtain such signatures form a different entity, such as the registry, and provide them to querying parties.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of associating a blockchain address with a network identifier, the method comprising:
   receiving, over a computer network and by a network identifier infrastructure operator, a request for a registration status of the network identifier;
   retrieving, by the network identifier infrastructure operator and in response to the receiving the request, an association of the network identifier with the blockchain address;
   signing, using a private key associated with the network identifier infrastructure operator and in response to the retrieving the association, a unique identifier to prevent replay attacks and the association of the network identifier with the blockchain address, wherein a signed association is determined based at least in part on the signing the association of the network identifier with the blockchain address; and
   providing, in response to the signing and by the network identifier infrastructure operator, the signed association of the network identifier with the blockchain address over the computer network.

2. The method of claim 1, wherein the network identifier comprises an internet domain name.

3. The method of claim 1, wherein the network identifier infrastructure operator comprises a Domain Name System (DNS) registry.

4. The method of claim 1, wherein the request for the registration status of the network identifier comprises one of a Registration Data Access Protocol (RDAP) request, a Repository-based Data Dissemination (RDD) protocol request, or a WHOIS request.

5. The method of claim 1, further comprising:
   receiving, from a network identifier registration facilitator, on behalf of a holder of the network identifier, and by the network identifier infrastructure operator, a storage request representing the blockchain address and the network identifier; and
   storing, in a persistent electronic memory and by the network identifier infrastructure operator, a representation of the association of the network identifier with the blockchain address.

6. The method of claim 5, wherein the storage request comprises a datum signed by a private key of an asymmetric key pair of the holder of the network identifier.

7. The method of claim 1, wherein the receiving, over the computer network and by the network identifier infrastructure operator, the request for a registration status of a network identifier comprises receiving, over the computer network and by the network identifier infrastructure operator, the request from an electronic wallet of a blockchain user engaging in a blockchain transaction with an owner of the blockchain address.

8. The method of claim 1, wherein the network identifier infrastructure operator is configured to respond to a request for a registration status of a second network identifier that is not associated with a blockchain address in a electronic persistent memory by:
   signing, by the private key of the network identifier infrastructure operator, an error message comprising at least the network identifier to produce a signed error message; and
   providing, over the computer network and by the network identifier infrastructure operator, the signed error message.

9. The method of claim 1, wherein the request for the registration status of the network identifier further identifies a message portion, wherein the method further comprises:
   signing the message portion.

10. A system comprising:
    a memory containing instructions; and
    a processor, operably connected to the memory, that executes the instructions to perform operations comprising:
       receiving, over a computer network and by a network identifier infrastructure operator, a request for a registration status of the network identifier;
       retrieving, by the network identifier infrastructure operator and in response to the receiving the request, an association of the network identifier with a blockchain address;
       signing, using a private key associated with the network identifier infrastructure operator in response to the retrieving the association, a unique identifier to prevent replay attacks and the association of the network identifier with the blockchain address, wherein a signed association is determined based at least in part on the signing the association of the network identifier with the blockchain address; and
       providing, in response to the signing and by the network identifier infrastructure operator, the signed association of the network identifier with the blockchain address over the computer network.

11. The system of claim 10, wherein the network identifier comprises an internet domain name.

12. The system of claim 10, wherein the network identifier infrastructure operator comprises a Domain Name System (DNS) registry.

13. The system of claim 10, wherein the request for the registration status of the network identifier comprises one of a Registration Data Access Protocol (RDAP) request, a Repository-based Data Dissemination (RDD) protocol request, or a WHOIS request.

14. The system of claim 10, where the operations further comprise:
    receiving, from a network identifier registration facilitator, on behalf of a holder of the network identifier, and by the network identifier infrastructure operator, a storage request representing the blockchain address and the network identifier; and
    storing, in a persistent electronic memory and by the network identifier infrastructure operator, a representation of the association of the network identifier with the blockchain address.

15. The system of claim 14, wherein the storage request comprises a datum signed by a private key of an asymmetric key pair of the identifier holder of the network identifier.

16. The system of claim 10, wherein the receiving, over the computer network and by the network identifier infrastructure operator, the request for a registration status of a network identifier comprises receiving, over the computer network and by the network identifier infrastructure operator, the request from an electronic wallet of a blockchain user engaging in a blockchain transaction with an owner of the blockchain address.

17. The system of claim 10, wherein the network identifier infrastructure operator is configured to respond to a request for a registration status of a second network identifier that is not associated with a blockchain address in a electronic persistent memory by:
   signing, by the private key of the network identifier infrastructure operator, an error message comprising at least the network identifier to produce a signed error message; and
   providing, over the computer network and by the network identifier infrastructure operator, the signed error message.

18. The system of claim 10, wherein:
   the request further includes a message portion requesting a signature for the blockchain address; and
   determining the signed association of the network identifier with the blockchain address is based at least in part on the network identifier infrastructure operator signing the message portion using the private key.

19. The method of claim 1, wherein the association comprises human readable text.

20. The method of claim 1, further comprising:
   specifying the unique identifier to represent the blockchain address to a blockchain interface.

21. The system of claim 10, wherein the association comprises human readable text.

22. The system of claim 10, the operations further comprising:
   storing a representation of the association of the network identifier with the blockchain address in a storage device.

* * * * *